US010542804B1

(12) United States Patent
Wang

(10) Patent No.: US 10,542,804 B1
(45) Date of Patent: Jan. 28, 2020

(54) PROTECTIVE CASE

(71) Applicant: EVOLUTIVE LABS CO., LTD., Taichung (TW)

(72) Inventor: Ching-Fu Wang, Taichung (TW)

(73) Assignee: EVOLUTIVE LABS CO., LTD., Taichung (TW)

( * ) Notice: Subject to any disclaimer, the term of this patent is extended or adjusted under 35 U.S.C. 154(b) by 0 days.

(21) Appl. No.: 16/294,459

(22) Filed: Mar. 6, 2019

(30) Foreign Application Priority Data

Aug. 8, 2018 (TW) .............................. 107127644 A

(51) Int. Cl.
*A45C 11/00* (2006.01)
*H04B 1/3888* (2015.01)

(52) U.S. Cl.
CPC ............ *A45C 11/00* (2013.01); *H04B 1/3888* (2013.01); *A45C 2011/002* (2013.01)

(58) Field of Classification Search
CPC .. A45C 11/00; A45C 2011/002; H04B 1/3888
USPC ...................................................... 455/575.8
See application file for complete search history.

(56) References Cited

U.S. PATENT DOCUMENTS

| 2012/0018325 | A1* | 1/2012 | Kim | ....................... | A45C 11/00 206/320 |
| 2015/0001104 | A1* | 1/2015 | Kim | ....................... | A45C 11/00 206/37 |
| 2016/0204817 | A1* | 7/2016 | Kim | ..................... | H04B 1/3888 455/575.8 |
| 2016/0219999 | A1* | 8/2016 | Chang | .................... | A45C 11/00 |

* cited by examiner

*Primary Examiner* — Anthony S Addy
*Assistant Examiner* — Farid Seyedvosoghi
(74) *Attorney, Agent, or Firm* — WPAT, P.C., Intellectual Property Attorneys; Anthony King

(57) ABSTRACT

The present disclosure provides a protective case, which includes a main frame unit. The main frame unit includes an inner ring surface and an outer ring surface. The main frame unit has two first side portions, two second side portions and four round corner portions. The inner ring surface has a recess recessed toward the outer ring surface. The recess has at least one second groove region formed in one of the first side portions, the second side portions and the round corner portions, and at least one flat region connected to the second groove region. The second groove region is adjacent to a bottom surface and recessed toward the bottom surface. The flat region is configured in the main frame unit so as to facilitate demolding when the main frame unit is fabricated.

6 Claims, 13 Drawing Sheets

PROTECTIVE CASE

TECHNICAL FIELD

The present disclosure relates to a protective case for a handheld electronic device, and more particularly to a protective case, which can be assembled and dissembled.

BACKGROUND

Currently, there is a mobile phone case with a replaceable back cover for mounting on a mobile phone and protecting the mobile phone. The mobile phone case with the replaceable back cover includes a main frame unit having a hollow rectangle, and a back cover with a ring groove detachably mounted to the main frame unit, in which the back side of the back cover is printed with a fine pattern and the like. A user may choose different patterns according to various occasions or clothing, and thus the mobile phone shows different personal styles upon replacements of different back covers with various patterns. Hence, the mobile phone case with a replaceable back cover is quite popular in the market.

Although the mobile phone with the replaceable cover can have the above replacements of back covers, the main frame unit is formed with the ring groove during press molding, and production efficiency is affected since demolding is not easy.

BRIEF SUMMARY OF THE INVENTION

It is the purpose of the present disclosure to provide a protective case for facilitating demolding.

Therefore, the protective case of the present disclosure includes a main frame unit. The main frame unit includes an inner ring surface surrounding and defining an accommodation space, an outer ring surface opposite to the inner ring surface, and a top surface and a bottom surface connected to the inner ring surface and the outer ring surface and configured toward opposing directions. The main frame unit includes two first side portions spaced apart in an up-down direction, two second side portions spaced apart in a left-right direction, and four round corner portions connected to the first side portions and the second side portions. The up-down direction intersects the left-right direction. The inner ring surface has a recess recessed toward the outer ring surface, and the recess has at least one second groove region and at least one flat region, in which the at least one second region is formed on at least one of the first side portions, the second side portions and the round corner portions, the at least one flat region is connected to the second groove region, and the second groove region is adjacent to the bottom surface and recessed toward the bottom surface.

In the present disclosure, the flat portion is configured in the main frame unit so to facilitate demolding and enhance production efficacy when the main frame is manufactured by a press molding method.

BRIEF DESCRIPTION OF THE DRAWINGS

Other features and effects of the present disclosure will be clearly presented in the embodiments with reference to the drawings.

DETAILED DESCRIPTION

Figure 1:
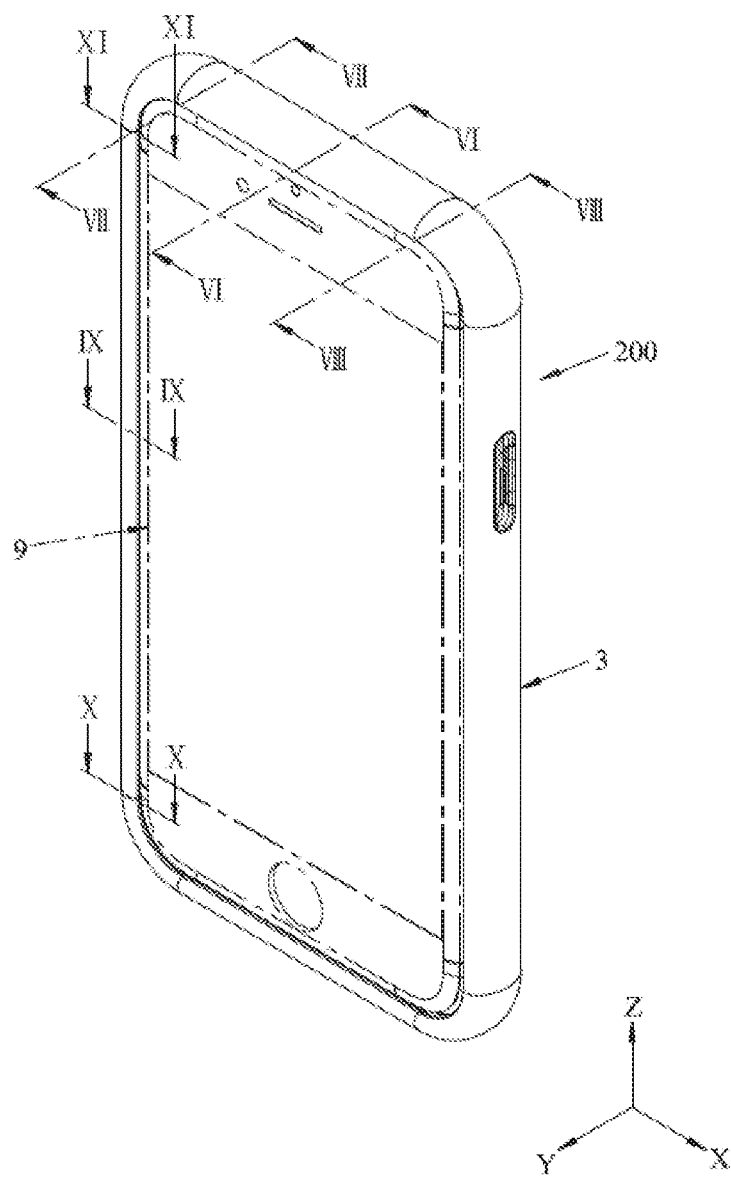
FIG. 1 is a perspective view showing a protective case mounted on a handheld electronic device according to a first embodiment of the present invention.

Before the present disclosure is described in detail, it should be noted that in the following description, similar elements are denoted by the same reference numerals.

Figure 2:
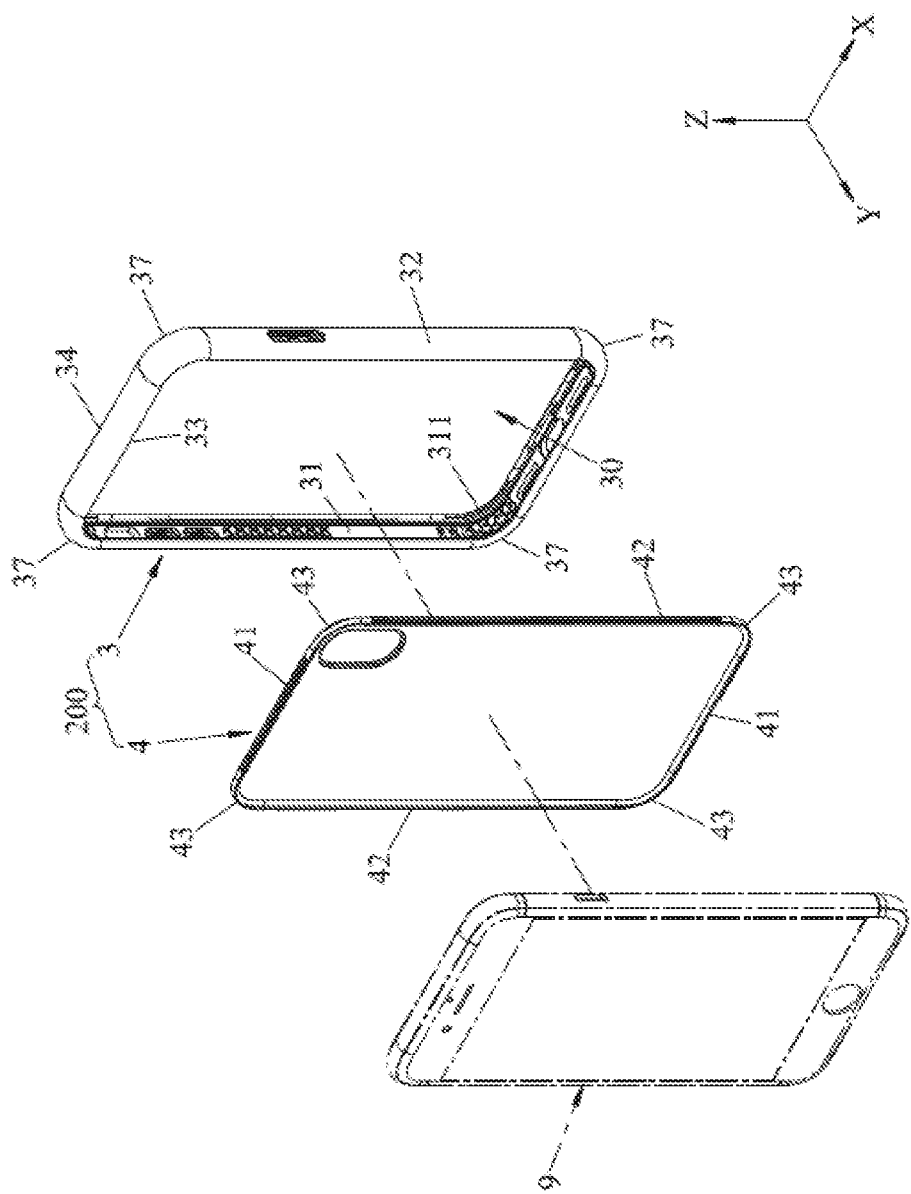
FIG. 2 is an exploded perspective view taken from FIG. 1.
Figure 3:
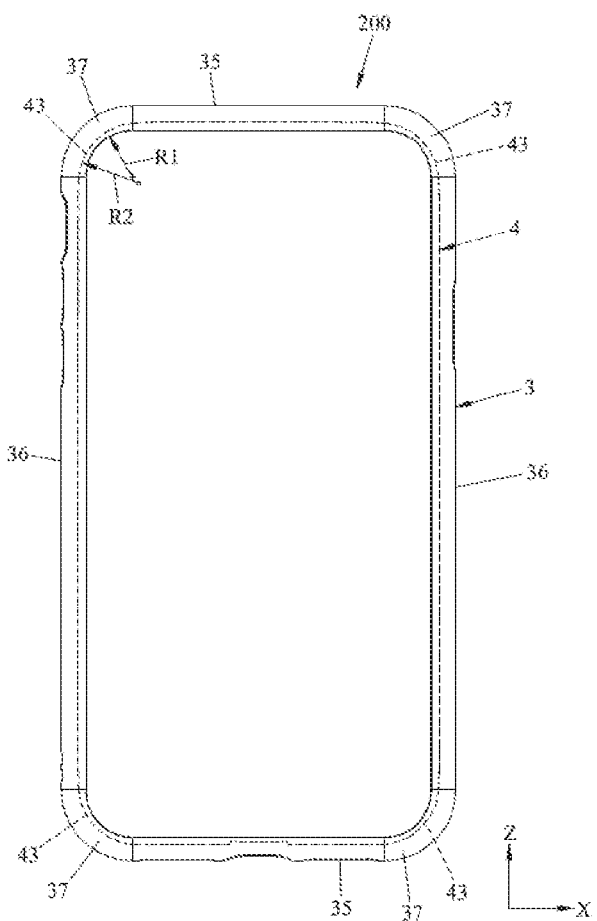
FIG. 3 is a plan view showing the first embodiment.
Figure 4:
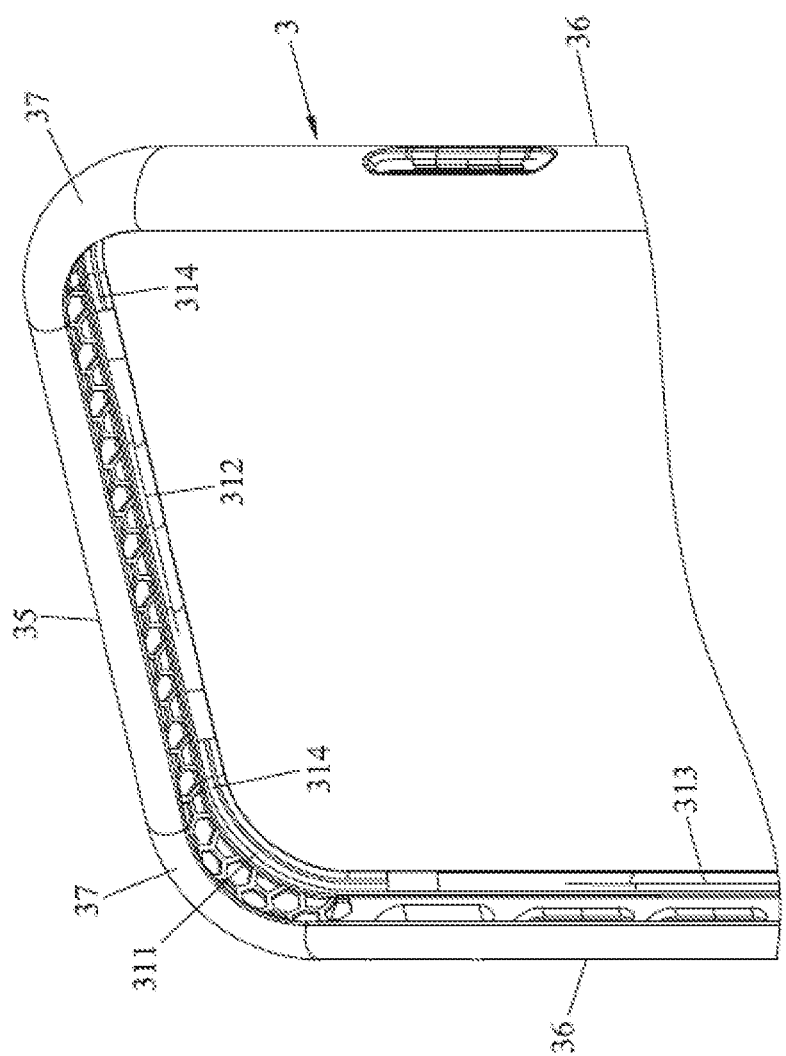
FIG. 4 is an enlarged perspective view showing a part of the main frame unit of the first embodiment.

Referring to FIG. 1, FIG. 2 and FIG. 3, in a first embodiment of the present disclosure, a protective case 200 is applicable to be mounted to a handheld electronic device 9. The protective case 200 includes a main frame unit 3 and an assembly unit 4.

The main frame unit 3 is substantially a hollow rectangle, and includes an inner ring surface 31 surrounding and defining an accommodating space 30, an outer ring surface 32 opposite to the inner ring surface 31, and a top surface 33 and a bottom surface 34 connected to the inner ring surface 31 and the outer ring surface 32 and configured toward opposing directions along a bottom-top direction Y. The main frame unit 3 includes two first side portions 35 spaced apart in an up-down direction Z, two second side portions 36 spaced apart in a left-right direction X, and four round corner portions 37 connected to the first side portions 35 and the second side portions 36. The bottom-top direction Y, the up-down direction Z and the left-right direction X are substantially perpendicular to each other. Each round corner portion 37 is defined by an inner arc and an outer arc. Each round corner portion 37 has an arc radius of R1 adjacent to the inner ring surface 31.

Figure 6:
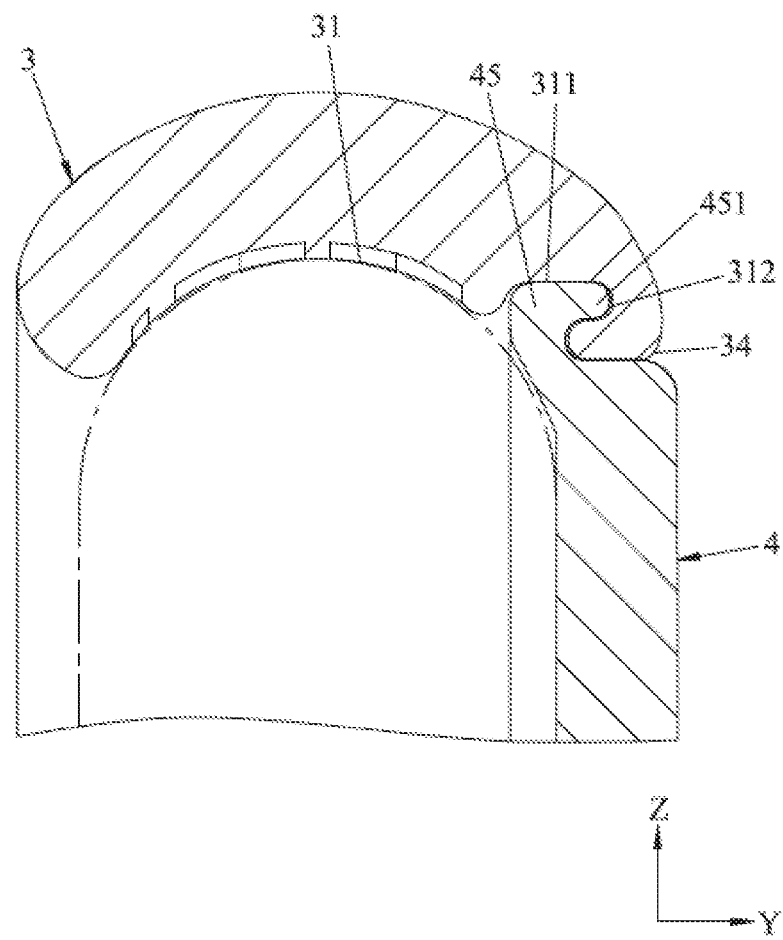
FIG. 6 is a partial cross-sectional view taken along line VI-VI of FIG. 1.
Figure 7:
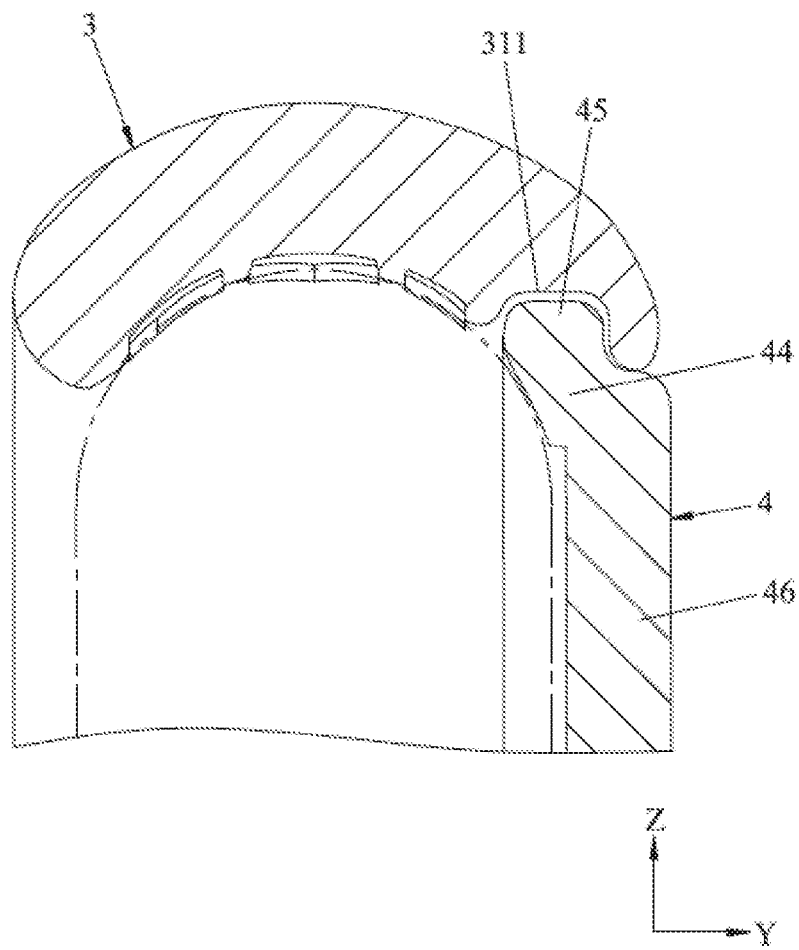
FIG. 7 is a partial cross-sectional view taken along line VII-VII of FIG. 1.
Figure 8:
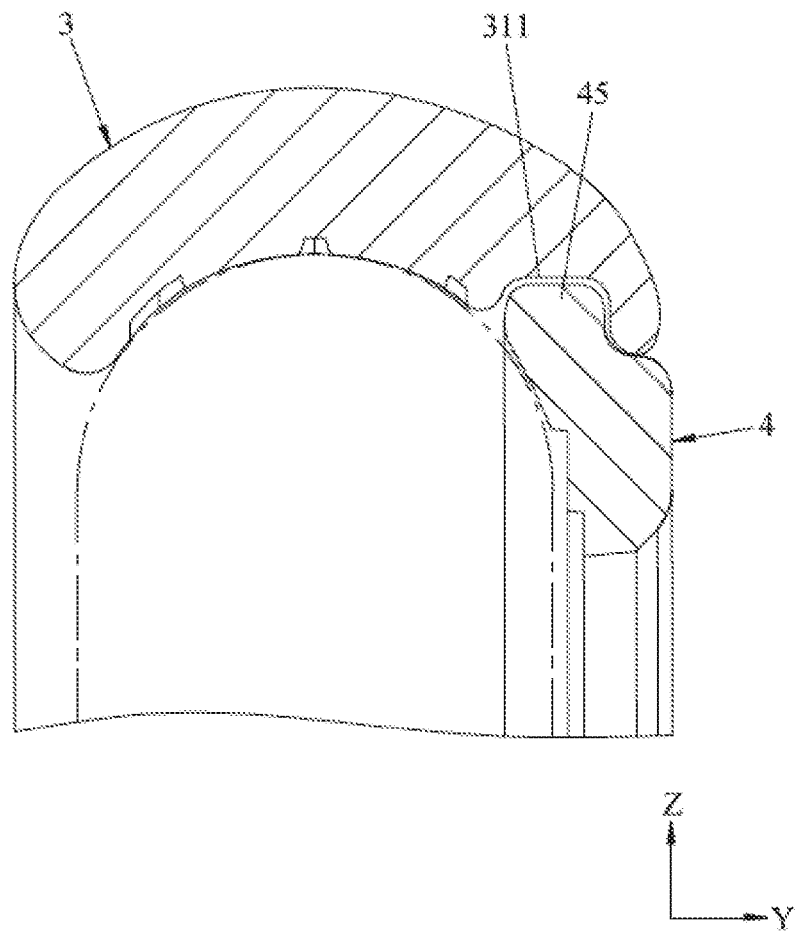
FIG. 8 is a partial cross-sectional view taken along line VIII-VIII of FIG. 1.
Figure 9:
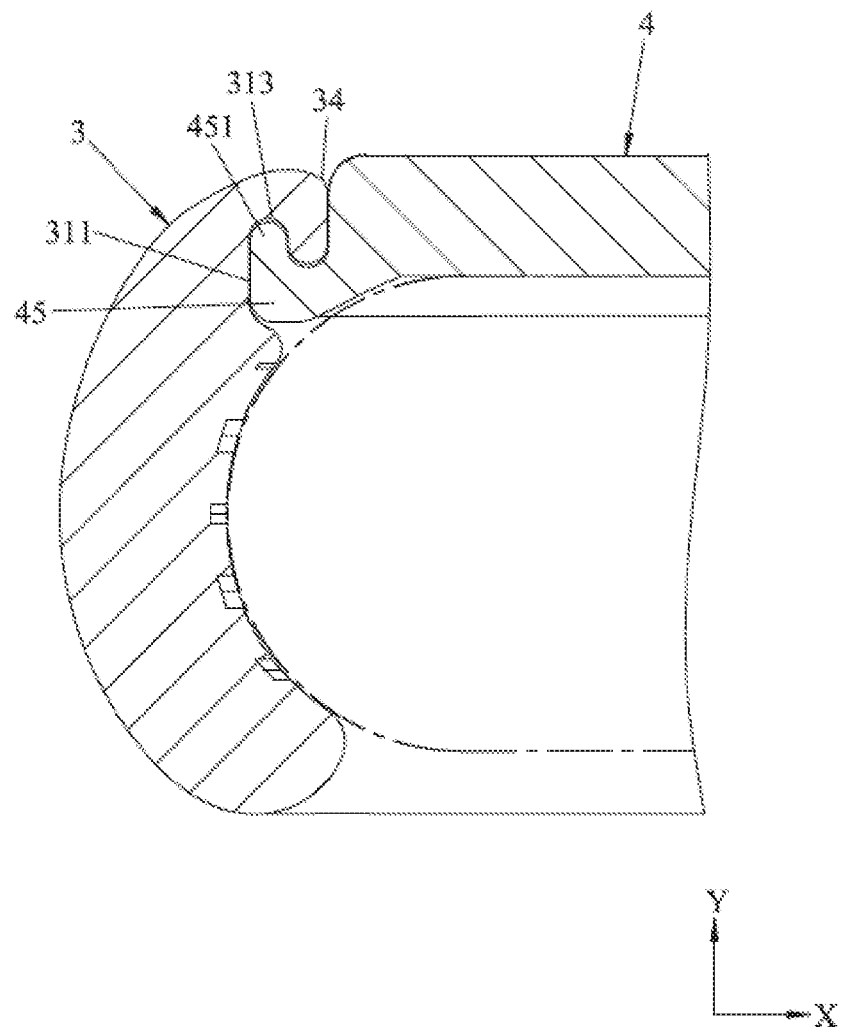
FIG. 9 is a partial cross-sectional view taken along line IX-IX of FIG. 1.

Referring to FIG. 2, FIG. 4, FIG. 6 and FIG. 9, the inner ring surface 31 of the main frame unit 3 has a recess 311, which is circumferentially surrounded and recessed toward the outer ring surface 32. The recess 311 is adjacent to the bottom surface 34. In the first embodiment, the recess 311 has two first groove regions 312 respectively formed on the first side portions 35, two second groove regions 313 respectively formed on the second side portions 36, and four flat regions 314 respectively connected to the first groove regions 312 and the second groove regions 313. More specifically, each of the first groove regions 312 is disposed in the center of the corresponding first side portion 35, each of the second groove regions 313 is disposed in the center of the corresponding side portion 36, the flat regions 314 are respectively disposed on the round corner portions 37, and two sides of each flat region 314 both extend and are connected to the adjacent first groove region 312 and the adjacent second groove region 313. As shown in FIG. 6 and FIG. 9, each of the first groove regions 312 and each of the second groove regions 313 are recessed toward the bottom surface 34 along the bottom-up direction Y.

It is to be noted that when the main frame unit 3 is fabricated by the press molding method, the configuration of the flat regions 314 facilitates demolding and enhances production efficiency.

Figure 5:
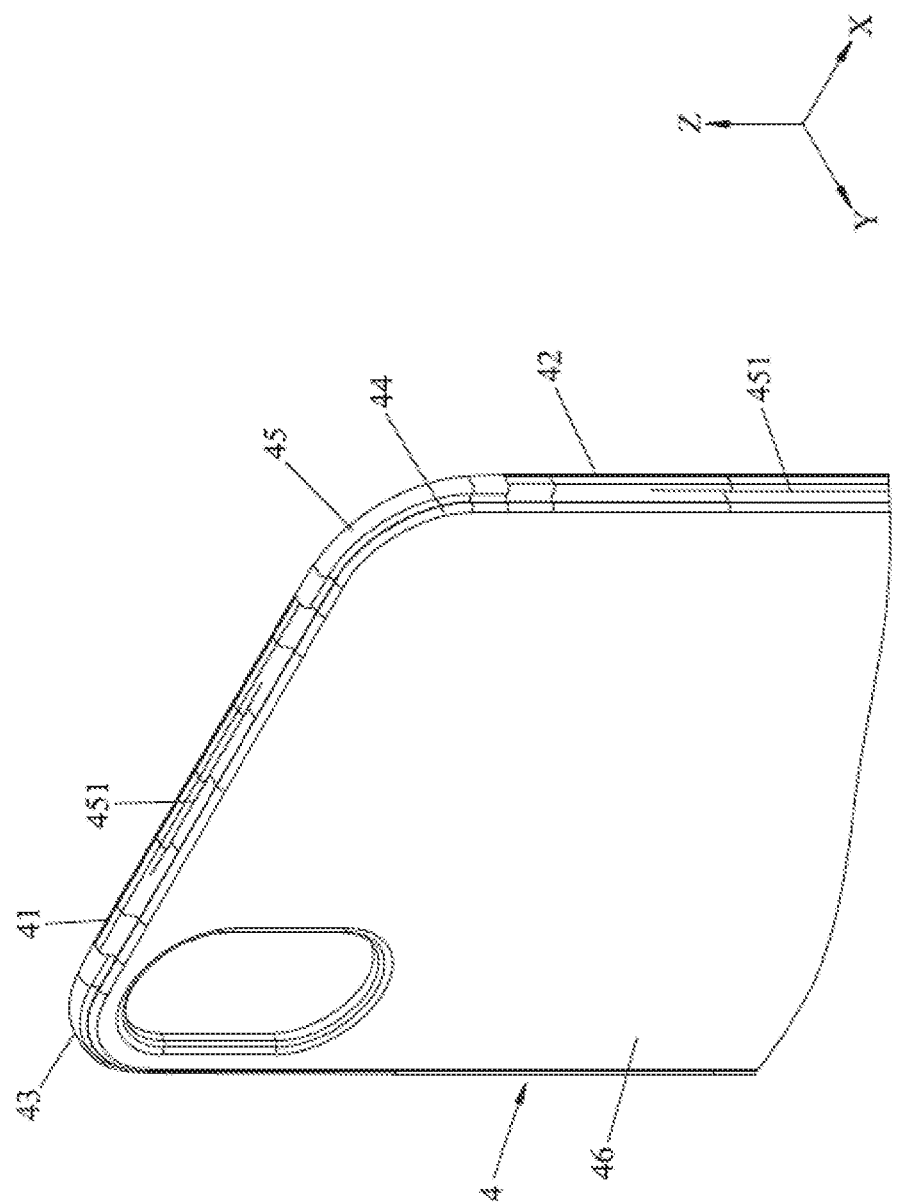
FIG. 5 is an enlarged perspective view showing a part of the assembly unit of the first embodiment.

Referring to FIG. 2, FIG. 3 and FIG. 5, the assembly unit 4 can be detachably mounted on the main frame unit 3, and the assembly unit 4 has two first long sides 41 spaced apart in the up-down direction Z, two second long sides 42 spaced apart in the left-right direction X, and four curved arcs 43 respectively connected to the first long sides 41 and the second long sides 42. The curved arcs 43 are respectively corresponding to the round corner portions 37, and each curved arc 43 has an arc radius of R2. In the first embodiment of the present disclosure, by reducing the outer edge of the curved arc 43, the R2 of each curved arc 43 is greater than the R1 of the corresponding round corner portion 37, such that a yield is generated between the assembly unit 4 and the main frame unit 3 to facilitate assembly or disassembly.

Referring to FIG. 2 and FIG. 5, the assembly unit 4 is substantially rectangular to match the shape of the main frame unit 3. The assembly unit 4 includes a ring wall 44 which forms a circumferential surrounding and is adjacent to the bottom surface 34 of the main frame unit 3, an extending wall 45 which extends toward the outside from the ring wall 44, and a base wall 46 which is connected to the ring wall 44 and configured as an entire surface. In the first embodiment of the present disclosure, there are patterns (not shown) on the back side of the base wall 46, such that when the protective case according to the first embodiment of the present disclosure is mounted on the handheld electronic device 9, the personal visual effect can be exhibited.

Figure 10:
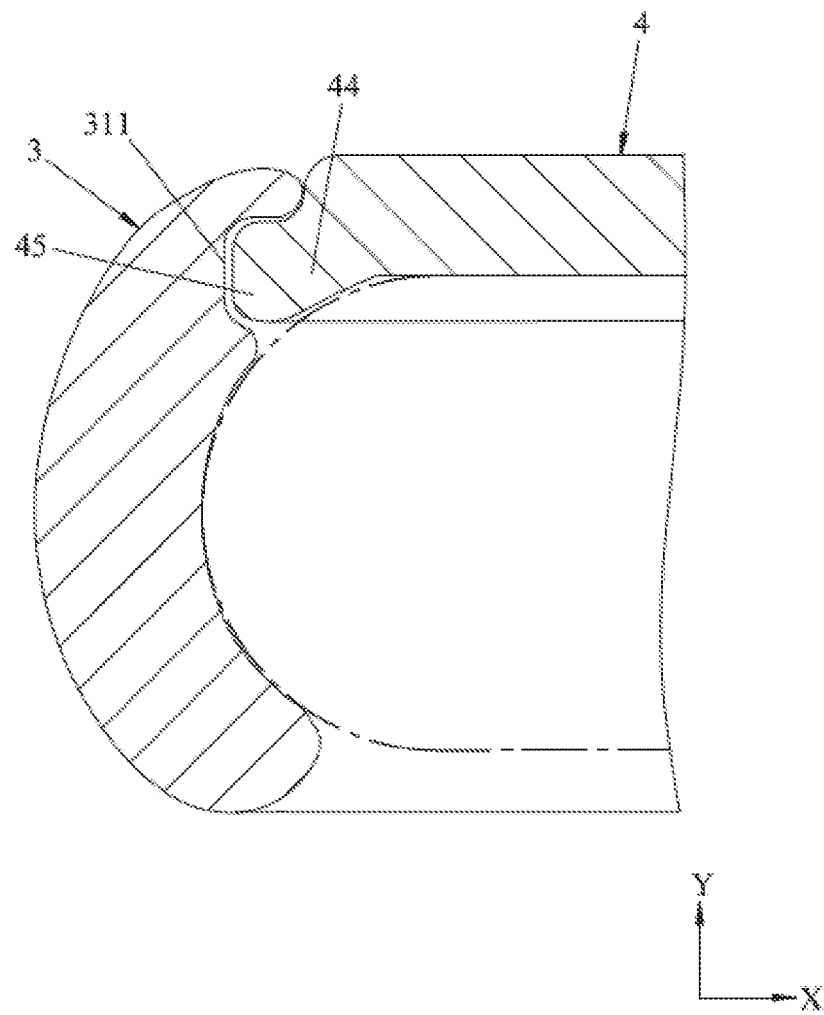
FIG. 10 is a partial cross-sectional view taken along line X-X of FIG. 1.
Figure 11:
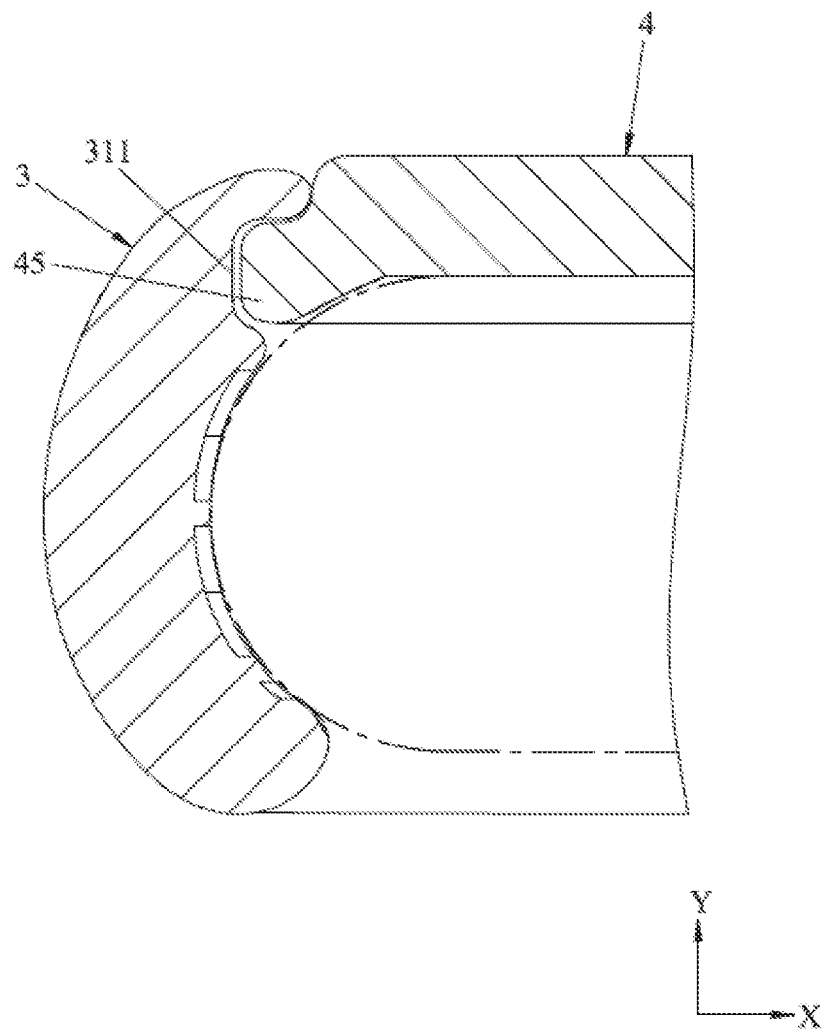
FIG. 11 is a partial cross-sectional view taken along line XI-XI of FIG. 1.

Referring to FIG. 5 to FIG. 8, the extending wall 45 is disposed in the recess 311 of the main frame unit 3. In the first embodiment of the present disclosure, the extending wall 45 has four snap flanges 451 extending toward the bottom side. As shown in FIG. 6, two of the snap flanges 451 are respectively adjacent to the centers of the first long sides 41, respectively correspond to and match the first groove regions 312 of the main frame unit 3, and are hooked into the corresponding first groove regions 312. The other two of the snap flanges 451 are respectively adjacent to the centers of the second long sides 42 as shown in FIG. 9 to FIG. 11, and these two snap flanges 451 respectively correspond to and match the second groove regions 313 of the main frame unit 3, and are hooked into the corresponding second groove regions 313. The extending wall 45 is disposed in the recess 311 of the main frame unit 3.

Based on the above, the hooking of the snap flanges 451 to the first groove regions 312 and the second groove regions 313 enables the assembly unit 4 to be stably mounted on the main frame unit 3 without accidental separation. In other variations, the first groove regions 312 can be omitted for the recess 311 of the main frame unit 3, and also the two snap flanges 451 adjacent to the centers of the first long sides 41 are omitted for the assembly unit 4, such that the two snap flanges 451 adjacent to the centers of the second long sides 42 are hooked into the second groove regions 313. The assembly unit 4 can thus be stably mounted on the main frame unit 3 without accidental separation. Similarly, in other variations, the second groove regions 313 can be omitted for the recess 311 of the main frame unit 3, and also the two snap flanges 451 adjacent to the centers of the second long sides 42 are omitted for the assembly unit 4, such that the two snap flanges 451 adjacent to the centers of the first long sides 41 are hooked into the first groove regions 312.

It should be noted that in the above embodiment, for convenience of explanation and understanding, the first groove regions 312 in the recess 311 are symmetrically disposed in the main frame unit 3 and formed in the centers of the first side portions 35, and the second groove regions 313 in the recess 311 are symmetrically disposed in the main frame unit 3 and formed in the centers of the second side portions 36. However, the present disclosure is not limited to the above illustration. The first groove regions 312 and the second groove regions 313 are not limited to be disposed in the centers of the first side portions 35 or the second side portions 36, and are not limited to be disposed symmetrically. In other words, the first groove regions 312 and the second groove regions 313 can be optionally formed at any positions of the first side portions 35, the second side portions 36 or the round corner portions 37, and the numbers of the first groove regions 312 and the second groove regions 313 formed in the first side portions 35 or the second side portions 36 are not limited. For example, one of the first side portions 35 has one first groove region 312, and the other of the first side portions 35 has no first groove region 312 and second groove region 313. Alternatively, one of the second side portions 36 has one second groove region 313, and the other of the second side portions 36 has no first groove region 312 and second groove region 313. Further, in the above embodiment, the first groove regions 312 and the second groove regions 313 are disposed in the first side portions 35 and the second side portions 36, and the flat regions 314 are disposed in the round corner portions 37. However, the present disclosure is not limited to the above illustration. In other embodiments, the first groove regions 312 and the second groove regions 313 can be disposed in the round corner portions 37, and the flat regions 314 can be disposed in the first side portions 35 and the second side portions 36. Similarly, it can be that any one of the four round corner portions 37 has the second groove region 313. In the above embodiment, as long as the number and the positions of the snap flanges 451 of the assembly unit 4 are correspondingly varied, the hooking of each snap flange 451 into each first groove region or second groove region 313 can be kept. These variations are all within the scope of the present disclosure.

As shown in FIG. 2, in use, after the assembly unit 4 is mounted on the main frame unit 3 and the protective case 200 of the first embodiment is formed, the handheld electronic device 9 can be assembled into the first embodiment. If another assembly unit (not shown) is used for the replacement, the handheld electronic device 9 is first dissembled from the first embodiment, the assembly unit 4 is then dissembled from the main frame unit 3, the another assembly unit is assembled to the main frame unit 3, and then the handheld electronic device 9 is assembled into the protective case 200, so as to complete the replacement.

Based on the above descriptions, the advantages of the present disclosure can be summarized as follows.

1. The snap flanges 451 are respectively hooked into the first groove region 312 and the second groove regions 313, such that the assembly unit 4 can be stably mounted on the main frame unit 3.

2. The flat regions 314 are disposed in the recess 311 of the main frame unit 3, such that when the main frame unit 3 is manufactured by a press molding method, it is easy to demold and enhance production efficiency.

3. By reducing the outer edges of the curved arcs of the assembly unit 4, the R2 of each curved arc is greater than the R1 of the corresponding round corner portion, such that a yield is generated between the assembly unit 4 and the main frame unit 3 to facilitate assembly or disassembly of the assembly unit 4 and the main frame unit 3.

Figure 12:
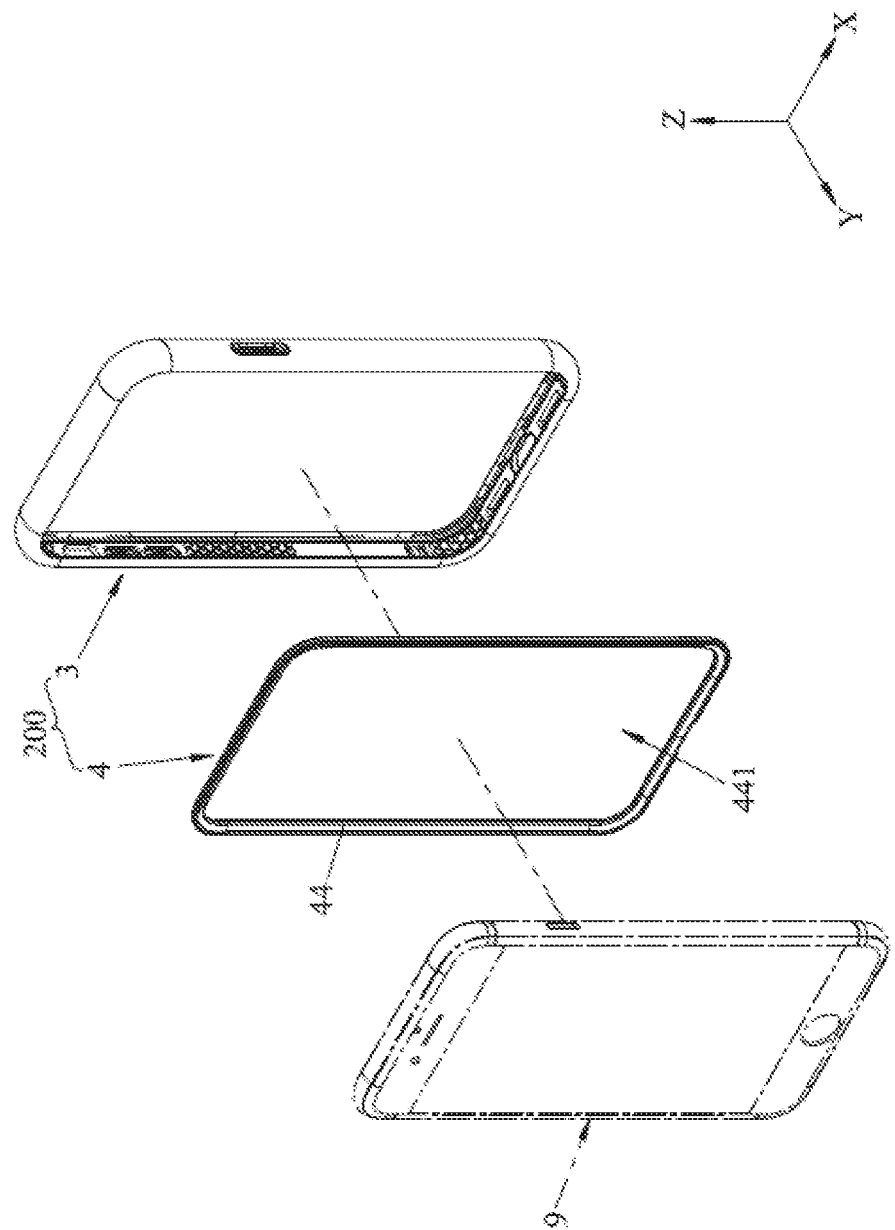
FIG. 12 is an exploded perspective view showing a protective case mounted on a handheld electronic device according to a second embodiment of the present invention.
Figure 13:
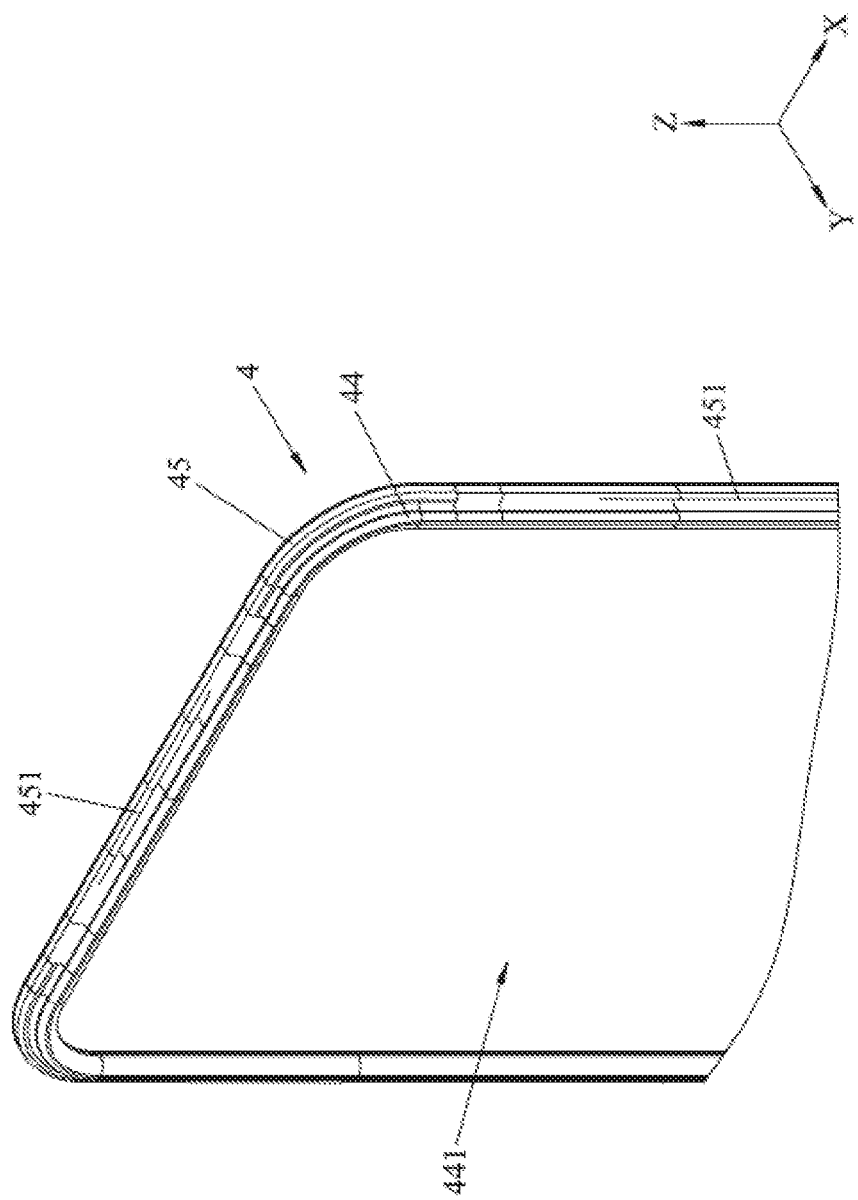
FIG. 13 is an enlarged perspective view showing a part of the assembly unit of the second embodiment.

Referring to FIG. 12 and FIG. 13, which show a protective case 200 according a second embodiment of the present disclosure, the second embodiment is similar to the first embodiment except the following differences.

In the second embodiment of the present disclosure, the base walls 46 (shown in FIG. 5) are omitted for the assembly unit 4, and a ring wall 44 of the assembly unit 4 surrounds and defines a hollow portion 441, such that the assembly unit 4 forms a frame strip of a hollow rectangle. The second embodiment is generally applied in the case where the handheld electronic device 9 needs to be protected and the back surface of the handheld electronic device 9 can be externally displayed through the hollow portion 441. The second embodiment provides an alternative option for the replacement. Therefore, the second embodiment has the same purpose and effects as the first embodiment described above.

The above embodiments are only used for illustrating the present invention, and the present invention is not limited to these embodiments. The above embodiments can be properly changed without departing the scope of claims of the present invention.

What is claimed is:

1. A protective case, comprising:
a main frame unit, including an inner ring surface surrounding and defining an accommodation space, an outer ring surface opposite to the inner ring surface, and a top surface and a bottom surface connected to the inner ring surface and the outer ring surface and configured toward opposing directions,
wherein the main frame unit includes two first side portions spaced apart in an up-down direction, two second side portions spaced apart in a left-right direction, and four round corner portions connected to the first side portions and the second side portions, the up-down direction intersects the left-right direction, the inner ring surface has a recess recessed toward the outer ring surface, and the recess has two second groove regions and two flat regions, the flat regions are connected to the second groove regions, and the second groove regions are adjacent to the bottom surface and recessed toward the bottom surface; and
an assembly unit detachably mounted on the main frame unit, wherein the assembly unit has two first long sides spaced apart in the up-down direction and two second long sides spaced apart in the left-right direction, and the assembly unit includes a ring wall adjacent to the bottom surface of the main frame unit and an extending wall extending from the ring wall toward the outside and disposed in the recess of the main frame unit,
wherein the recess of the main frame unit is circumferentially surrounded, the second groove regions are respectively formed on the second side portions, and the extending wall of the assembly unit has two snap flanges corresponding to and matching the second groove regions.

2. The protective case of claim 1, wherein each of the round corner portions of the main frame unit has an arc radius of R1 adjacent to the inner ring surface, the assembly unit further includes four curved arcs respectively connected to the first long sides and the second long sides, each of the curved arcs has an arc radius of R2, the curved arcs are respectively corresponding to the round corner portions, and R2 is greater than R1.

3. The protective case of claim 1, wherein the ring wall of the assembly unit forms a circumferential surrounding, and the ring wall surrounds and defines a hollow portion.

4. The protective case of claim 1, wherein the assembly unit further includes a base wall connected to the ring wall and is configured as an entire surface.

5. A protective case, comprising:
a main frame unit, including an inner ring surface surrounding and defining an accommodation space, an outer ring surface opposite to the inner ring surface, and a top surface and a bottom surface connected to the inner ring surface and the outer ring surface and configured toward opposing directions,
wherein the main frame unit includes two first side portions spaced apart in an up-down direction, two second side portions spaced apart in a left-right direction, and four round corner portions connected to the first side portions and the second side portions, the up-down direction intersects the left-right direction, the inner ring surface has a recess recessed toward a first direction, and the recess has two second groove regions and two flat regions, the flat regions are connected to the second groove regions, the second groove regions are adjacent to the bottom surface and recessed toward a second direction, and the first direction is substantially perpendicular to the second direction; and
an assembly unit detachably mounted on the main frame unit, wherein the assembly unit has two first long sides spaced apart in the up-down direction and two second long sides spaced apart in the left-right direction, and the assembly unit includes a ring wall adjacent to the bottom surface of the main frame unit and an extending wall extending from the ring wall toward the outside and disposed in the recess of the main frame unit,
wherein the recess of the main frame unit is circumferentially surrounded, the second groove regions are respectively formed on the second side portions, and the extending wall of the assembly unit has two snap flanges corresponding to and matching the second groove regions.

6. A protective case, comprising:
a main frame unit, including an inner ring surface surrounding and defining an accommodation space, an outer ring surface opposite to the inner ring surface, and a top surface and a bottom surface connected to the inner ring surface and the outer ring surface and configured toward opposing directions,
wherein the main frame unit includes two first side portions spaced apart in an up-down direction, two second side portions spaced apart in a left-right direction, and four round corner portions connected to the first side portions and the second side portions, the up-down direction intersects the left-right direction, the inner ring surface has a recess recessed toward the outer ring surface, and the recess has four groove regions and four flat regions, the flat regions are connected to the groove regions, and the groove regions are adjacent to the bottom surface and recessed toward the bottom surface; and
an assembly unit detachably mounted on the main frame unit, wherein the assembly unit has two first long sides spaced apart in the up-down direction and two second long sides spaced apart in the left-right direction, and the assembly unit includes a ring wall adjacent to the bottom surface of the main frame unit and an extending wall extending from the ring wall toward the outside and disposed in the recess of the main frame unit, wherein the recess of the main frame unit is circumferentially surrounded, the groove regions are respectively formed on the first side portions and the second side portions, and the extending wall of the assembly unit has four snap flanges corresponding to and matching the groove regions.

* * * * *